(12) United States Patent
Song et al.

(10) Patent No.: US 9,903,945 B2
(45) Date of Patent: Feb. 27, 2018

(54) VEHICLE MOTION ESTIMATION ENHANCEMENT WITH RADAR DATA

(71) Applicant: GM GLOBAL TECHNOLOGY OPERATIONS LLC, Detroit, MI (US)

(72) Inventors: Xiaofeng F. Song, Novi, MI (US); Hualin Tan, Novi, MI (US); Shuqing Zeng, Sterling Heights, MI (US)

(73) Assignee: gm global technology operations llc, Detroit, MI (US)

( * ) Notice: Subject to any disclaimer, the term of this patent is extended or adjusted under 35 U.S.C. 154(b) by 504 days.

(21) Appl. No.: 14/614,164

(22) Filed: Feb. 4, 2015

(65) Prior Publication Data

US 2016/0223661 A1 Aug. 4, 2016

(51) Int. Cl.
| | |
|---|---|
| G01S 13/93 | (2006.01) |
| G01S 13/60 | (2006.01) |
| G01S 13/86 | (2006.01) |
| G01S 13/87 | (2006.01) |
| B60W 40/105 | (2012.01) |

(52) U.S. Cl.
CPC .......... *G01S 13/60* (2013.01); *B60W 40/105* (2013.01); *G01S 13/86* (2013.01); *G01S 13/874* (2013.01); *G01S 13/931* (2013.01); *G01S 13/605* (2013.01); *G01S 13/878* (2013.01); *G01S 2013/9342* (2013.01); *G01S 2013/9346* (2013.01); *G01S 2013/9353* (2013.01); *G01S 2013/9371* (2013.01)

(58) Field of Classification Search
CPC ........ G01S 13/60; G01S 13/605; G01S 13/86; G01S 13/931; G01S 2013/9353; G01S 2013/9371

USPC .................................................... 342/70–72
See application file for complete search history.

(56) References Cited

U.S. PATENT DOCUMENTS

| | | | | |
|---|---|---|---|---|
| 5,307,293 A | * | 4/1994 | Sakai | G01P 3/36 702/143 |
| 5,534,871 A | * | 7/1996 | Hidaka | G01S 13/325 342/113 |
| 5,986,601 A | * | 11/1999 | Sugimoto | G01S 7/415 342/109 |
| 6,300,896 B1 | * | 10/2001 | Kull | G01S 13/92 342/104 |

(Continued)

FOREIGN PATENT DOCUMENTS

| | | |
|---|---|---|
| CN | 102288148 A | 12/2011 |
| CN | 103287358 A | 9/2013 |

(Continued)

OTHER PUBLICATIONS

State Intellectual Property Office of the People's Republic of China, Office Action in Chinese Patent Application No. 201610078920.4 dated Oct. 20, 2017.

(Continued)

*Primary Examiner* — Peter M Bythrow

(74) *Attorney, Agent, or Firm* — Lorenz & Kopf, LLP

(57) ABSTRACT

Methods and systems for estimating motion of a vehicle are provided. Radar data pertaining to one or more stationary objects in proximity to the vehicle are obtained via one or more radar units of the vehicle. The motion of the vehicle is estimating using the radar data via a processor of the vehicle.

20 Claims, 4 Drawing Sheets

(56) References Cited

U.S. PATENT DOCUMENTS

| | | | |
|---|---|---|---|
| 6,671,595 B2* | 12/2003 | Lu | B60T 8/17551 180/197 |
| 6,812,882 B2 | 11/2004 | Ono | |
| 7,337,650 B1* | 3/2008 | Preston | B60W 40/11 73/1.38 |
| 9,162,682 B2* | 10/2015 | Hohm | B60W 40/105 |
| 2003/0076255 A1* | 4/2003 | Ono | G01S 13/34 342/70 |
| 2004/0000991 A1* | 1/2004 | Schiffmann | G01S 13/505 340/435 |
| 2005/0004762 A1* | 1/2005 | Takahama | G01S 17/936 701/301 |
| 2006/0100760 A1* | 5/2006 | Marchthaler | B60R 21/0132 701/45 |
| 2007/0002305 A1* | 1/2007 | Lehre | G01S 7/4026 356/4.01 |
| 2008/0042894 A1* | 2/2008 | Kikuchi | B60W 10/184 342/71 |
| 2009/0040501 A1* | 2/2009 | Matsuo | G01S 7/411 356/4.01 |
| 2009/0070039 A1* | 3/2009 | Beuschel | B60T 7/22 701/301 |
| 2009/0278672 A1* | 11/2009 | Weilkes | B60W 40/02 340/435 |
| 2010/0017128 A1* | 1/2010 | Zeng | B60W 40/105 701/301 |
| 2011/0295549 A1* | 12/2011 | Takabayashi | G01S 7/4004 702/142 |
| 2012/0136621 A1* | 5/2012 | Inomata | B61L 25/025 702/143 |
| 2012/0169532 A1* | 7/2012 | Yamada | G01S 13/87 342/25 R |
| 2013/0218398 A1* | 8/2013 | Gandhi | B60R 16/02 701/31.1 |
| 2015/0005993 A1* | 1/2015 | Breuing | G01S 17/58 701/19 |
| 2015/0369912 A1* | 12/2015 | Kishigami | G01S 13/26 342/113 |
| 2016/0178742 A1* | 6/2016 | Shikatani | G01S 13/60 342/113 |

FOREIGN PATENT DOCUMENTS

| | | |
|---|---|---|
| CN | 103661591 A | 3/2014 |
| EP | 1014108 A1 | 6/2000 |
| EP | 1378764 A1 | 1/2004 |
| EP | 2026096 A1 | 2/2009 |

OTHER PUBLICATIONS

Su Yu-Gang et al., "Intelligent Control Techniques for AMT Vehicle Automatic Cruise System," Journal of Chongqing University (Natural Science Edition), Jan. 31, 2007, pp. 77-80, vol. 30, Issue 1, China.

* cited by examiner

VEHICLE MOTION ESTIMATION ENHANCEMENT WITH RADAR DATA

TECHNICAL FIELD

The present disclosure generally relates to vehicles, and more particularly relates to methods and systems for vehicle motion estimation with radar data.

BACKGROUND

Many vehicles today utilize techniques for estimating motion of the vehicle. For example, such motion estimates, such as velocity of the vehicle, are used in control of active safety features of vehicles, such as automatic braking, braking assist, steering assist, traction control, electronic stability control, lane departure warning, lane change awareness, and various other active safety features. However, such techniques may not always be optimal in all situations. For example, it may be difficult to correctly estimate a vehicle's velocity while the vehicle is not in a steady state condition, for example when the vehicle is on a surface with a relatively low coefficient of friction.

Accordingly, it is desirable to provide techniques for estimating motion of vehicles, such as a velocity of the vehicle, and for example that can be used when the vehicle is not in a steady stat condition, such as when the vehicle is on a surface with a relatively low coefficient of friction. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises obtaining radar data pertaining to one or more stationary objects in proximity to a vehicle, and estimating a motion of the vehicle using the radar data.

In accordance with an exemplary embodiment, a system is provided. The system comprises one or more radar sensors of a vehicle and a processor. The one or more radar sensors are configured to at least facilitate obtaining radar data pertaining to one or more stationary objects in proximity to the vehicle. The processor is coupled to the one or more radar sensors, and is configured to at least facilitate estimating a motion of the vehicle using the radar data.

In accordance with a further exemplary embodiment, a vehicle is provided. The vehicle comprises a body, one or more radar sensors, and a processor. The one or more radar sensors are configured to at least facilitate obtaining radar data pertaining to one or more stationary objects in proximity to the vehicle. The processor is disposed within the body, and is coupled to the one or more radar sensors. The processor is configured to at least facilitate estimating a movement of the vehicle using the radar data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
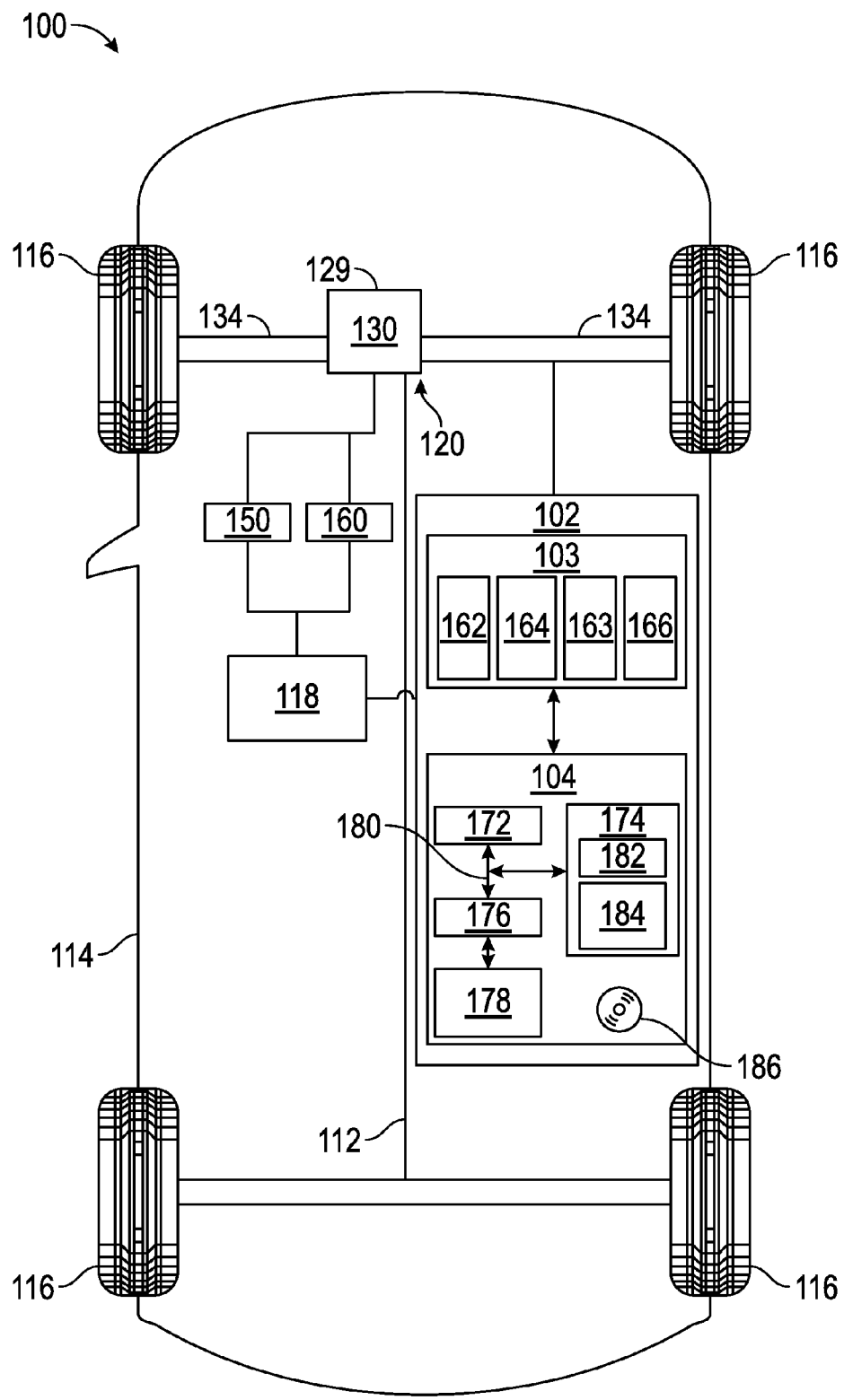
FIG. 1 is a functional block diagram of a vehicle that includes a control system that estimates a motion of the vehicle, in accordance with an exemplary embodiment.

FIG. 1 illustrates a vehicle 100, or automobile, according to an exemplary embodiment. As described in greater detail further below, the vehicle 100 includes a control system 102 for estimating motion of the vehicle 100 using radar data with respect to stationary objects in proximity to the vehicle 100. In certain embodiments, the control system 102 is part of and/or is coupled to one or more active safety systems for the vehicle 100, such as for automatic braking, braking assist, steering assist, traction control, electronic stability control, lane departure warning, lane change awareness, and/or for one or more other active safety features. As discussed further below, the control system 102 includes a sensor array 103 and a controller 104 that are used for determining and implementing the vehicle motion estimates.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 100, in certain embodiments the vehicle 100 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 100, in certain embodiments steering, braking, and/or acceleration can be commanded by a computer instead of by a driver.

The control system 102 is mounted on the chassis 112. As discussed above, the control system 102 estimates movement of the vehicle 100 using radar data with respect to stationary objects in proximity to the vehicle 100, and includes a sensor array 103 and a controller 104.

The sensor array 103 includes various sensors (also referred to herein as sensor units) that are utilized to calculate a velocity of the vehicle using different techniques. In the depicted embodiments, the sensor array 103 includes one or more radar sensors 162, yaw sensors 163, wheel speed sensors 164, and inertial measurement sensors 166 (also referred to herein as inertial measurement units). The radar sensors 162 collect information pertaining to stationary objects in proximity to the vehicle 100. The yaw sensors 163 measure a yaw rate of the vehicle 100. The wheel speed sensors 164 measure wheel speeds of one or more of the wheels 116 of the vehicle 100. The inertial measurement unit 166 provides measurements pertaining to the orientation and acceleration of the vehicle 100 orientation and acceleration. The measurements and information from the various sensors of the sensor array 103 are provided to the controller 104 for processing.

The controller 104 is coupled to the sensor array 103. The controller 104 utilizes the various measurements and information from the sensors array 103 for estimating movement of the vehicle 100 using different techniques. In certain embodiments, the controller 104 utilizes radar data from the radar sensors 162 pertaining to stationary objects in proximity to the vehicle, along with a vehicle yaw rate from the yaw sensors 163, to calculate a first measure of velocity for the vehicle 100. Also in certain embodiments, the controller 104 utilizes measurements from the wheels speed sensors 164 and the inertial measurement unit 166, along with a dynamic model, to calculate a second value of the velocity of the vehicle 100. The controller 104 utilizes the first value of the velocity to enhance the second value of the velocity under certain circumstances, such as when the vehicle 100 is not in a steady state and/or if when the vehicle 100 is travelling on a surface (e.g., an icy road) with a relatively low coefficient of friction. The controller 104, along with the sensor array 103, also provide additional functions, such as those discussed further below in connection with the schematic drawings of the vehicle 100 in FIGS. 2 and 3 and the flowchart of the process 400 in FIG. 4, both discussed further below.

As depicted in FIG. 1, the controller 104 comprises a computer system. In certain embodiments, the controller 104 may also include one or more of the sensors of the sensor array 103, one or more other devices and/or systems, and/or components thereof. In addition, it will be appreciated that the controller 104 may otherwise differ from the embodiment depicted in FIG. 1. For example, the controller 104 may be coupled to or may otherwise utilize one or more remote computer systems and/or other control systems, such as the electronic control system 118 of FIG. 1.

In the depicted embodiment, the computer system of the controller 104 includes a processor 172, a memory 174, an interface 176, a storage device 178, and a bus 180. The processor 172 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 104 and the computer system of the controller 104, generally in executing the processes described herein, such as the process 400 described further below in connection with FIG. 4.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., any stored dynamic models, thresholds, and/or other values) for use in making the determinations.

The bus 180 serves to transmit programs, data, status and other information or signals between the various components of the computer system of the controller 104. The interface 176 allows communication to the computer system of the controller 104, for example from a system driver and/or another computer system, and can be implemented using any suitable method and apparatus. In one embodiment, the interface 176 obtains the various data from the sensors of the sensor array 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 400 (and any sub-processes thereof) described further below in connection with FIG. 4. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 104 may also otherwise differ from the embodiment depicted in FIG. 1, for example in that the computer system of the controller 104 may be coupled to or may otherwise utilize one or more remote computer systems and/or other control systems.

While the control system 102, the sensory array 103, and the controller 104 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, and/or the electronic control system 118.

Figure 2:
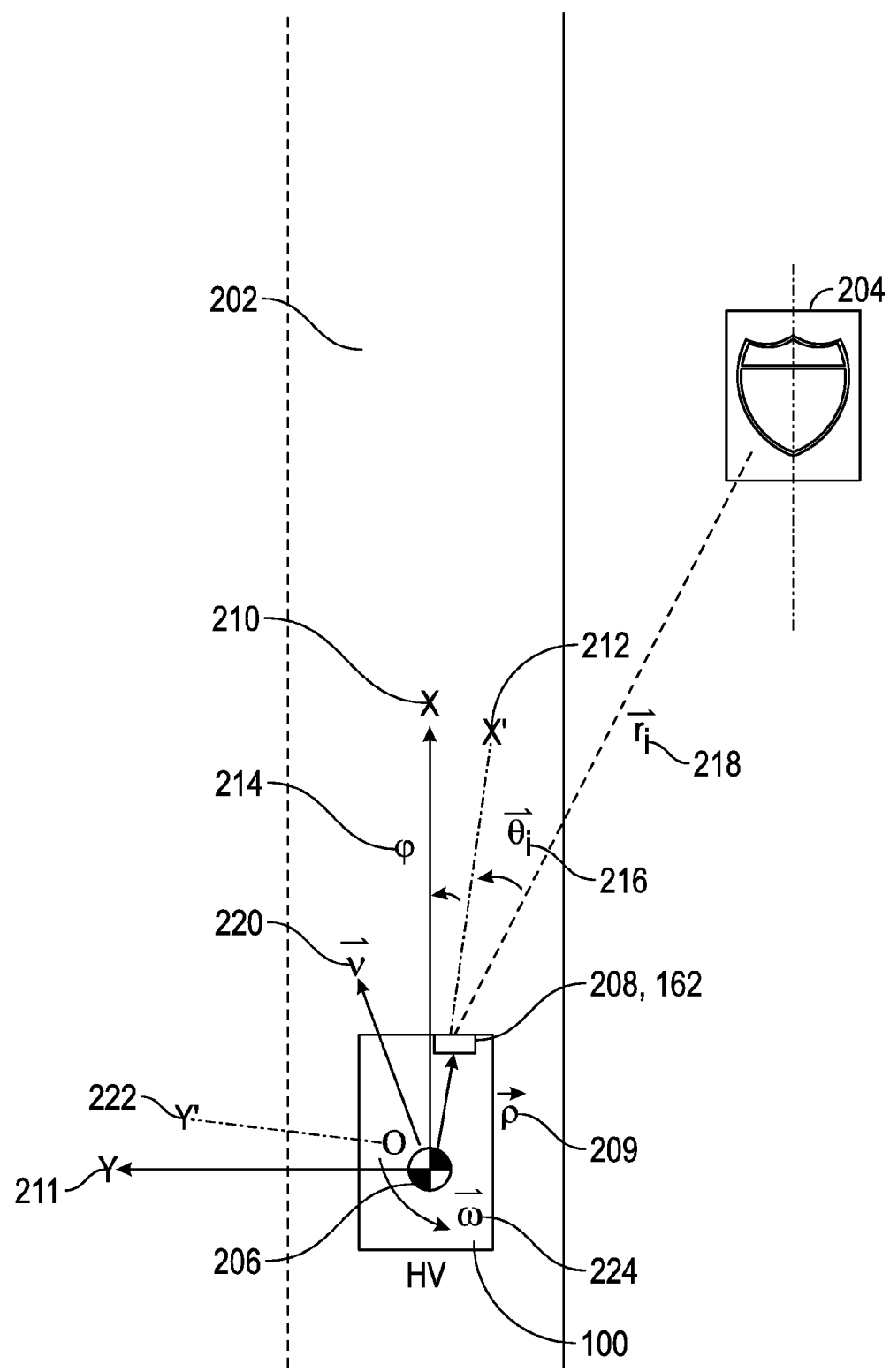
FIGS. 2 and 3 are schematic diagrams showing the vehicle of FIG. 1 depicted alongside a roadway in proximity to one or more stationary objects that are utilized by the control system of FIG. 1 for estimating the motion of the vehicle, in accordance with exemplary embodiments.
Figure 3:
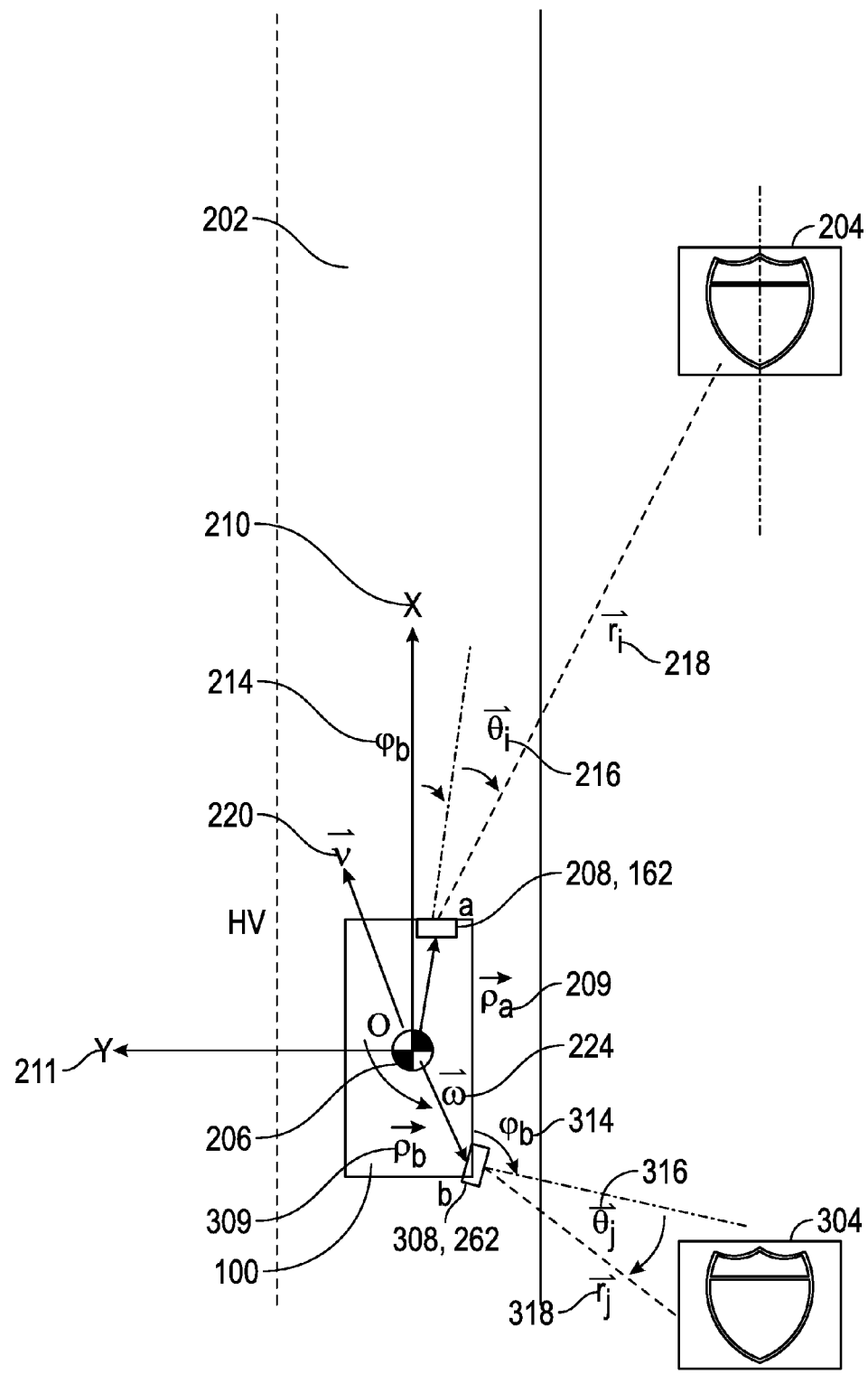

FIGS. 2 and 3 are schematic diagrams showing the vehicle 100 of FIG. 1, depicted alongside a roadway 202 in proximity to one or more stationary objects 204, 304 that are utilized by the control system 102 of FIG. 1 for estimating the motion of the vehicle 100, in accordance with exemplary embodiment. In both FIGS. 2 and 3, the vehicle 100 is shown having a center of gravity 206. Also in both FIGS. 2 and 3, X (210) and Y (211) represent the X, Y coordinates for the vehicle 100, vector (V) (220) represents a direction of travel of the vehicle 100, and the ω vector (224) represents the yaw rate for the vehicle 100.

FIG. 2 depicts the vehicle 100 as having a first radar sensor 208 (of the radar sensors 162 of the sensor array 103 of FIG. 1) located at a first location on the vehicle 100. The first radar sensor 208 collects information regarding, and tracks, one or more first stationary objects 204. In the example of FIG. 2, the location of the first radar sensor 208 is located at a front portion of the vehicle 100, to the passenger's side of the center of the vehicle 100, and tracks stationary object 204. The location may vary in other embodiments. Similarly, in various embodiments, multiple radar sensors may track a particular stationary object and/or each radar sensor may track multiple stationary objects, among other possible variations.

A position vector p of the first radar sensor 208 with respect to the center of gravity 206 of the vehicle 100 is denoted by reference numeral 209 in FIG. 2. The position vector 209 is preferably fixed. Also in FIG. 2, the first radar sensor 208 is disposed at an orientation angle φ (214) with respect to the center of gravity 206 of the vehicle 100, with the orientation angle 214 also preferably being fixed.

Also depicted in FIG. 2 is an azimuth angle θ (216) of the first radar sensor 208 with respect to the stationary object 204, along with a range $r_i$ (218) between the first radar sensor 208 and the first stationary object 204. The azimuth angle 216 and the range 218 will change as the vehicle 100 moves relative to the first stationary object 204.

FIG. 3 depicts the vehicle 100 as having, in addition to the first radar sensor 208 of FIG. 2, a second radar sensor 308 located at a second location on the vehicle 100. In this particular example, the second radar sensor 308 collects information regarding, and tracks, one or more second stationary objects 304. In the example of FIG. 3, the location of the second radar sensor 308 is located at a rear portion of the vehicle 100, at a passenger's side end of the vehicle 100. The location may vary in other embodiments. Similarly, as discussed above, in various embodiments, multiple radar sensors may track a particular stationary object and/or each radar sensor may track multiple stationary objects, among other possible variations.

In FIG. 3, the position vector (p) for the first radar sensor 208 is denoted as $p_a$ (209), and the position vector (p) for the second radar sensor 308 is denoted as $p_b$ (309). Similar to the discussion above, both position vectors 209, 309 are with respect to the center of gravity 206 of the vehicle 100, and are preferably fixed. Also in FIG. 3, the orientation angle of the first radar sensor 208 with respect to the center of gravity 206 is denoted as $φ_a$ (214), while the orientation angle of the second sensor 308 with respect to the center of gravity 206 is denoted as $φ_b$ (314). Also similar to the discussion above, the orientation angles 214 and 314 are preferably fixed.

In addition, as depicted in FIG. 3, the azimuth angle of the first radar sensor 208 with respect to the first stationary object 204 is denoted as azimuth angle $θ_a$ (216), while the azimuth angle of the second radar sensor 308 with respect to the second stationary object 304 is denoted as azimuth angle $θ_b$ (316). Also in FIG. 3, the range of the first radar sensor 208 with respect to the first stationary object 204 is denoted as $r_i$ (218), while the range of the second radar sensor 308 with respect to the second stationary object 304 is denoted as $r_j$ (318). In addition, similar to the discussion above, the azimuth angles 216, 316 and the ranges 218, 318 will change as the vehicle 100 moves relative to the stationary objects 204, 304.

Figure 4:
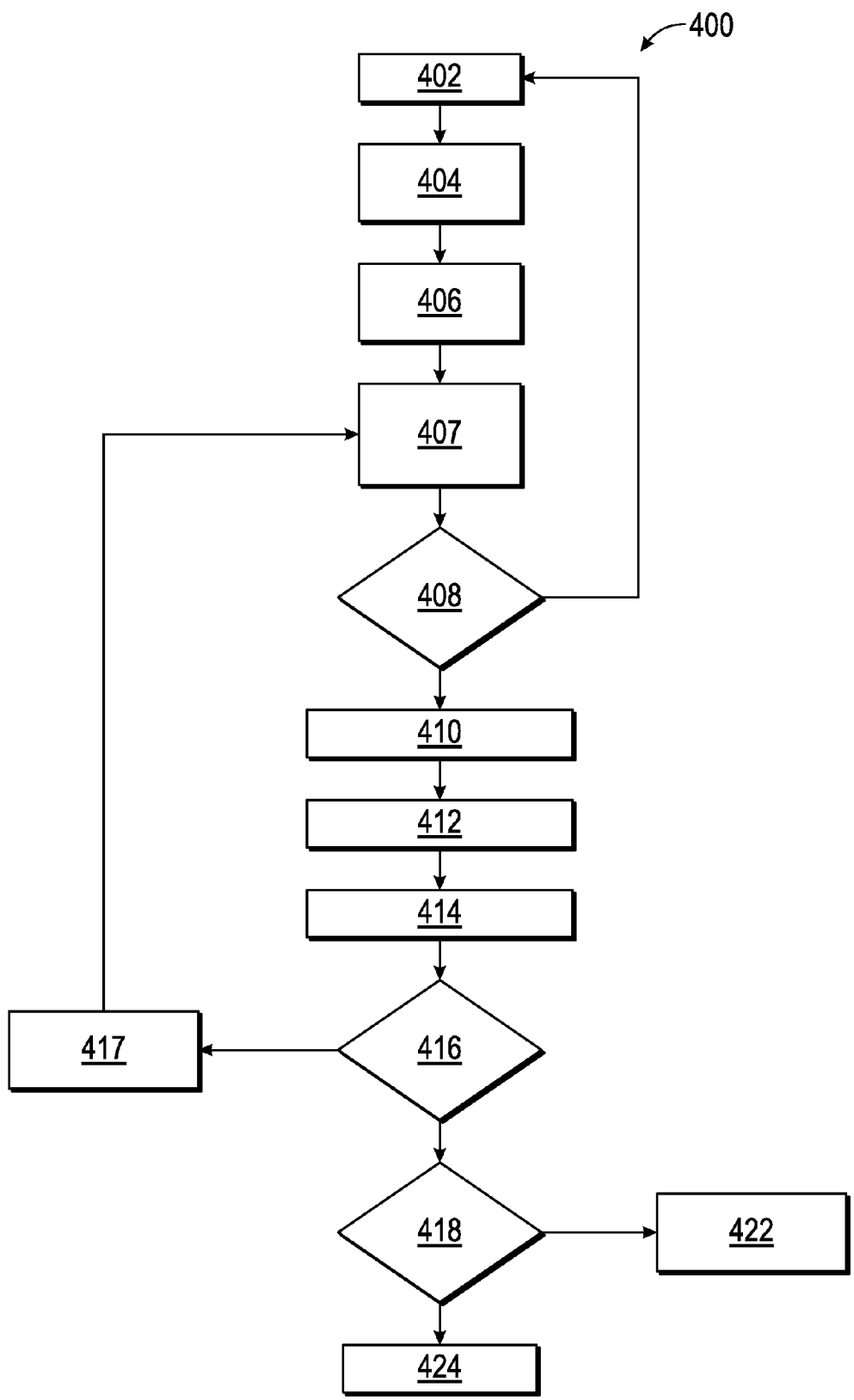
FIG. 4 is a flowchart of a process for estimating a motion of the vehicle, and that can be used in connection with the vehicle of FIGS. 1-3, in accordance with an exemplary embodiment.

FIG. 4 is a flowchart of a process 400 for estimating motion of a vehicle, in accordance with an exemplary embodiment. The process 400 can be implemented in connection with the vehicle 100, including the control system 102, of FIGS. 1-3, in accordance with an exemplary embodiment.

As depicted in FIG. 4, the process 400 is initiated at step 402. Once the process is initiated, radar data is obtained (step 404). The radar data pertains to stationary objects, such as stationary objects 204, 304 denoted in FIGS. 2 and 3, which are in proximity to the vehicle 100 of FIGS. 1-3. In various embodiments, the stationary objects may comprise one or more road edges, guard rails, medians, signs, buildings, trees, and/or one or more other stationary objects that are in proximity to the vehicle and/or the roadway on which the vehicle is travelling.

In various embodiments, the radar data is obtained via the transmission and receipt of radar signals using the radar sensors 162 of FIG. 1 (e.g., also corresponding to the first radar sensor 208 of FIG. 2, the second radar sensor 308 of FIG. 3, and/or one or more other radar sensors 162). The radar sensors 162 transmit radar signals using a transmitter. The transmitting radar signals subsequently contact the stationary objects (as well as potentially contacting moving objects, such as other vehicles) on or alongside the road on which the vehicle 100 is travelling. After contacting the stationary objects (as well as potentially other objects), the radar signals are reflected, and travel from the other vehicles and/or other objects in various directions, including some signals returning toward the vehicle 100. The radar signals returning to the vehicle 100 (also referred to herein as received radar signals) are received by radar sensors 162 via a receiver. The received radar signals are then provided to the processor 172 of FIG. 1 (for example, via the interface 176 of the controller 104) for processing.

In addition to the received radar signals, the processor 172 also obtains additional data from additional sensors of the sensor array 103 of FIG. 1 via the interface 176 (step 406). Specifically, in certain embodiments, yaw rate values for the vehicle 100 are measured by the yaw sensors 163 of FIG. 1. In addition, in certain embodiments, wheel speeds for the vehicle 100 are measured using the wheel speed sensors 164 of FIG. 1. In one such embodiment, wheel speeds are determined for each of the wheels 116 of FIG. 1 as measured by respective wheel speed sensors 164 of FIG. 1 for each wheel 116. Also in certain embodiments, additional measurements, for example pertaining to the vehicle 100's orientation and/or acceleration, are obtained via the inertial measurement unit 166 of FIG. 1.

In step 407, vehicle motion calculations are performed based on the sensor data of step 406. In certain embodiments, the vehicle motion calculations include calculated estimates of vehicle velocity using wheel speed sensors and/or vehicle inertial measurements. Also in certain embodiments, velocity estimates $V_x$, $V_y$ are determined based on one or more dynamic models using the wheel speed measurements and/or the vehicle inertial measurements (e.g., acceleration and/or orientation) from step 406. In one embodiment, step 407 is performed by the processor 172 of FIG. 1.

A determination is made as to which of the tracked objects are stationary objects (step 408). In one embodiment, the radar data of step 404 is used to monitor the various objects contacted by the radar signals over time in various iterations, in order to determine which of the objects are stationary. In addition, in step 410, the objects are tracked and buffered over time to verify that they are in fact stationary objects. In one embodiment, these determinations are performed by the processor 172 of FIG. 1 using radar data from the radar sensors 162 of FIGS. 1-3 from step 404.

An estimate of the motion of the vehicle is generated using the radar data (step 412). Specifically, in one embodiment, one or more measures of velocity for the vehicle are generated using the radar data of step 404 over time (e.g. over multiple iterations) with respect to the objects that were verified to be stationary objects over time, as well as the yaw rate data from step 406. In various embodiments, this is performed by the processor 172 of FIG. 1, for example using various techniques discussed below.

In one embodiment in which a single radar sensor 162 is used (e.g., the first radar sensor 208 of FIGS. 2 and 3), a velocity vector is determined in accordance with the following equation:

$$\vec{v} = -\vec{\Omega} \times (\vec{r}+\vec{p}) - \dot{\vec{r}} - \vec{\theta} \times \vec{r} \qquad \text{(Equation 1)},$$

in which $\vec{v}$ represents the velocity vector of the vehicle, $\vec{\omega}$ represents a yaw vector for the vehicle, $\vec{r}_1$ represents a range vector between the radar sensor and a stationary object (e.g., a difference vector reflecting a position difference, or distance, between the first radar sensor 208 and the first stationary object 204 of FIGS. 2 and 3), $\vec{p}$ represents a position vector of the radar sensor with respect to the center of gravity of the vehicle (e.g., the center of gravity 206 of FIGS. 2 and 3), $\dot{\vec{r}}$ represents a rate of change of the range vector between the radar sensor and the stationary object (e.g., the rate of change of range vector 218 of FIGS. 2 and 3), and $\dot{\vec{\theta}}$ represents a rate of change of the azimuth angle between the radar sensor and the stationary object (e.g., the rate of change of azimuth angle 216 of FIGS. 2 and 3).

Also in one embodiment in which a single radar sensor is used, vertical and horizontal components ($V_x$, $V_y$) of the vehicle's velocity can be calculated as follows:

$$V_x = \omega(r_i \sin \theta'_i + p_x) - \dot{r}_i \cos \theta'_i + \dot{\theta}_i r_i \sin \theta'_i \qquad \text{(Equation 2)},$$

$$V_y = -\omega(r_i \cos \theta'_i + p_y) - \dot{r}_i \sin \theta'_i - \dot{\theta}_i r_i \cos \theta'_i \qquad \text{(Equation 3), and}$$

$$\theta'_i = \theta_i + \phi \qquad \text{(Equation 4)},$$

in which $\omega$ represents a yaw rate of the vehicle, $r_i$ represents a range (or distance) between the radar sensor (e.g. the first radar sensor 208 of FIGS. 2 and 3) and the stationary object (e.g., the first stationary object 308 of FIGS. 2 and 3), $\dot{r}_i$ represents a rate of change of $r_i$, $\theta_i$ represents the azimuth angle between the radar sensor and the "i" the stationary object (e.g., the first stationary object 204 of FIGS. 2 and 3), $\dot{\theta}_1$ represents a rate of change of $\theta_i$, $\phi$ represents the angle of orientation of the radar sensor with respect to the center of gravity of the vehicle, $p_x$ represents a coordinate of the position of the radar sensor with respect to the center of gravity of the vehicle on the "X" coordinate (210) of FIGS. 2 and 3, and $p_y$ represents a coordinate of the position of the radar sensor with respect to the center of gravity of the vehicle on the "Y" coordinate (212) of FIGS. 2 and 3.

In one embodiment in which multiple radar sensors are utilized and/or in connection with multiple stationary objects, the radar sensors may be denoted as radar sensor "a" (e.g., the first radar sensor 208 of FIGS. 2 and 3), radar sensor "b" (e.g., the second radar sensor 308 of FIG. 3), and the like for any number of radar sensors, each of which may track any number of stationary objects. The stationary objects tracked may be denoted as stationary object "i" (e.g., the first stationary object 204 of FIGS. 2 and 3), stationary object "b" (e.g., the second stationary object 304 of FIGS. 2 and 3), and the like for any number of stationary objects. Different velocity values can then be calculated for the various radar sensor, stationary object combinations.

For example, for the combination of radar sensor "a" (e.g. the first radar sensor) and stationary object "i" (e.g., the first stationary object), the horizontal and vertical velocity components $V_x(i,a)$ and $V_y(i,a)$ are calculated as follows:

$$V_x(i,a) = \omega(r_i \sin \theta'_i + p_{x,a}) - \dot{r}_i \cos \theta'_i + \dot{\theta}_i r_i \sin \theta'_i \qquad \text{(Equation 5) and}$$

$$V_y(i,a) = -\omega(r_i \cos \theta'_i + p_{y,a}) - \dot{r}_i \sin \theta'_i - \dot{\theta}_i r_i \cos \theta'_i \qquad \text{(Equation 6)},$$

in which $p_{x,a}$ represents an "X" coordinate of the position of radar sensor "a" with respect to the center of gravity of the vehicle, and $p_{y,a}$ represents a "Y" coordinate of the position of radar sensor "a" with respect to the center of gravity of the vehicle.

Similarly, for the combination of radar sensor "b" (e.g. the second radar sensor) and stationary object "j" (e.g., the second stationary object), the horizontal and vertical velocity components $V_x(j,b)$ and $V_y(j,b)$ are calculated as follows:

$$V_x(j,b) = \omega(r_j \sin \theta'_j + p_{x,b}) - \dot{r}_j \cos \theta'_j + \dot{\theta}_j r_j \sin \theta'_j \quad \text{(Equation 7) and}$$

$$V_y(j,b) = -\omega(r_j \cos \theta'_j + p_{y,b}) - \dot{r}_j \sin \theta'_j - \dot{\theta}_j r_j \cos \theta'_j \quad \text{(Equation 8)},$$

in which $p_{x,b}$ represents an "X" coordinate of the position of radar sensor "b" with respect to the center of gravity of the vehicle, and $p_{y,b}$ represents a "Y" coordinate of the position of radar sensor "b" with respect to the center of gravity of the vehicle. the position of radar sensor "a" with respect to the center of gravity of the vehicle.

Composite vector velocities $V_x$ and $V_y$ can then be calculated based on all of the radar sensor combinations based on preliminary values for $V_x(i,k)$ from the "i-th" object and "k-th" sensor (e.g., k=a, b) using sample means calculated as follows:

$$V_x = \frac{\Sigma_{i,k} V_x(i,k)}{N}, \text{ and} \quad \text{(Equation 9)}$$

$$V_y = \frac{\Sigma_{i,k} V_y(i,k)}{N}, \quad \text{(Equation 10)}$$

in which "N" is the total number of measurements.

The motion estimates of step 412 are compared with corresponding motion estimates using one or more dynamic models (step 414). For example, velocity estimates $V_x$, $V_y$ of step 412 are compared with vehicle velocity estimates that are generated and/or obtained in step 414 based on one or more dynamic models using wheel speed measurements and/or vehicle inertial measurements (e.g., acceleration and/or orientation) from step 406, for example based on the calculations of step 407. Differences are also calculated between the velocity estimates of step 412 and the corresponding velocity measures from the dynamic models of step 414, for example based on the calculations of step 407.

A determination is made as to whether one or more difference(s) between the velocity estimates of step 412 and the corresponding velocity measures from the dynamic models of step 414 and/or the calculations of step 407 (e.g., average velocity values from both techniques) are greater than one or more predetermined threshold(s) (step 416). In one example, the predetermined threshold(s) are stored in the memory 174 are stored value(s) 184 thereof. In one embodiment, the determination of step 416 is performed by the processor 172 of FIG. 1.

If it is determined in step 416 that the difference(s) do not exceed the predetermined threshold(s), then the process proceeds to step 417. During step 417, the processor continues to use vehicle motion estimates based on the dynamic models of step 414 and/or the calculations of step 407. For example, in one embodiment, during step 417 the processor continues to use velocity estimates based on the dynamic models of step 414 and/or the calculations of step 407 rather than the radar-based velocity estimates of step 412, for implementation in connection with active safety features such as automatic braking, braking assist, steering assist, traction control, electronic stability control, lane departure warning, and lane change awareness. Also in one example, step 417 is implemented via instructions provided by the processor 172 of FIG. 1. In one embodiment, the process returns to step 407, as updated vehicle motion calculations from sensor data continue to be calculated, and the process continues. In another embodiment, the process then returns to step 404 in a new iteration.

Conversely, if it is determined in step 416 that the difference(s) do exceed the predetermined threshold(s), then a determination is made as to whether the vehicle is in a steady state (step 418). In one embodiment, the vehicle is determined to be in a steady state if the vehicle is being driven relatively straight with a relatively stable velocity and on a relatively stable roadway (e.g., with a relatively high coefficient of friction). Also in one embodiment, the vehicle is determined to be not in a steady state if any of these conditions are not satisfied; for example, if the vehicle is accelerating or decelerating significantly, making a turn, and/or being operated on a roadway with a relatively low coefficient of friction (e.g., on an icy road). In one embodiment, this determination is made by the processor 172 using data from one or more vehicle sensors (e.g., the inertial measurement unit 166 of FIG. 1) using one or more techniques known in the art.

If it is determined in step 418 that the vehicle is not in a steady state, then the process proceeds to step 422. During step 422, the processor uses the radar-based vehicle motion estimates of step 412 to enhance the vehicle motion estimates based on the dynamic models of step 414 and/or the calculations of step 407, for implementation in connection with active safety features such as automatic braking, braking assist, steering assist, traction control, electronic stability control, lane departure warning, and lane change awareness. In one embodiment, the processor uses the radar-based velocity estimates of step 412 instead of the velocity estimates based on the dynamic models of step 414 and/or the calculations of step 407 for such functionality. In another embodiment, the processor uses the radar-based velocity estimates of step 412 in addition to the velocity estimates based on the dynamic models of step 414 and/or the calculations of step 407 (for example, by using an arithmetic mean or another average for such values) for such functionality. Also in one example, step 422 is implemented via instructions provided by the processor 172 of FIG. 1. In one embodiment, the process then returns to step 404 in a new iteration.

Conversely, if it is determined in step 418 that the vehicle is in a steady state, then a notification is provided (step 424). In one example, an alert (e.g., a visual, haptic, and/or audio alert to the driver) is provided for the driver as to a possible fault, based on instructions provided by the processor 172 of FIG. 1. In certain embodiments, the process then proceeds to step 422, as the dynamic model-based motion (e.g., velocity) estimates of step 414 and/or the calculations of step 407 are enhanced by the radar-based motion (e.g. velocity) estimates of step 412, as discussed above. In certain other embodiments, the process may return to step 404 in a new iteration.

Accordingly, in the depicted embodiment, the enhancement of the dynamic model-based motion (e.g. velocity) estimates of step 414 and/or step 407 with the radar-based motion (e.g. velocity) estimates of step 412 is performed in step 422 at least when both of the following conditions are satisfied at the same time, namely: (A) (A) the difference between the motion (e.g. velocity) values exceeds a predetermined threshold, and (B) the vehicle is not in a steady state. Accordingly, in such situations in which the traditional dynamic models for motion may not function ideally, the process 400 provides such motion estimates to be enhanced with radar-based motion estimates that may perform better in such situations. Also as noted above, a fault is reported when both of the following conditions are satisfied, namely: (A) the difference between the motion (e.g. velocity) values exceeds a predetermined threshold, and (B) the vehicle is in a steady state.

It will be understood that this may vary in certain embodiments. For example, in certain embodiments, the enhancement of step 422 may be provided in other situations, or in some embodiments all situations, for example regardless of whether the vehicle is in a steady state and/or regardless of the difference(s) between the respective motion values. In yet other embodiments, the enhancement of step 422 may be performed when the vehicle is not in a steady state, regardless of the difference(s) in motion values. In yet other embodiments, the enhancement of step 422 may be performed when the difference(s) in motion values exceeds the predetermined threshold(s) of step 416, regardless of whether the vehicle is in a steady state, and so on.

It will be appreciated that the disclosed methods, systems, and vehicles may vary from those depicted in the Figures and described herein. For example, the vehicle 100, the control system 102, and/or various components thereof may vary from that depicted in FIGS. 1-3 and described in connection therewith. In addition, it will be appreciated that certain steps of the process 400 may vary from those depicted in FIG. 4 and/or described above in connection therewith. It will similarly be appreciated that certain steps of the method described above may occur simultaneously or in a different order than that depicted in FIG. 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
   obtaining radar data pertaining to one or more stationary objects in proximity to a vehicle via one or more radar sensors of the vehicle;
   tracking the one or more stationary objects, via a processor onboard the vehicle;
   calculating, via the processor onboard the vehicle, a first velocity value of the vehicle using sensor data from one or more additional vehicle sensors, other than radar sensors, in combination with a dynamic model for the vehicle;
   calculating, via the processor onboard the vehicle, a second velocity value of the vehicle using the radar data, based on the tracking of the one or more stationary objects; and
   comparing, via the processor onboard the vehicle, the first velocity value with the second velocity value, for use in implementing one or more active safety features of the vehicle.

2. The method of claim 1, wherein:
   the step of tracking the one or more stationary objects comprises tracking the one or more objects in proximity to the vehicle over time using the radar data while the vehicle is in a steady state; and
   the method further comprises verifying that the one or more objects are stationary objects based on the tracking.

3. The method of claim 1, further comprising:
   determining a range and range rate for the one or more stationary objects with respect to the vehicle based on the radar data;
   wherein the step of calculating the second velocity value comprises calculating the second velocity value using the range and the range rate.

4. The method of claim 3, further comprising:
   measuring a yaw rate for the vehicle; and
   obtaining a location and azimuth angle rate of one or more radar sensors of the vehicle with respect to a center of gravity of the vehicle via the radar data;
   wherein the step of calculating the second velocity value comprises calculating the second velocity value using the range, the range rate, the location, the azimuth angle rate, and the yaw rate.

5. The method of claim 1, further comprising:
   providing a notification if a difference between the first velocity value and the second velocity value exceeds a predetermined threshold value.

6. A system comprising:
   one or more radar sensors of a vehicle, the one or more radar sensors configured to at least facilitate obtaining radar data pertaining to one or more stationary objects in proximity to the vehicle; and
   a processor disposed onboard the vehicle and coupled to the one or more radar sensors, the configured to at least facilitate:
   tracking the one or more stationary objects;
   calculating a first velocity value of the vehicle using sensor data from one or more additional vehicle sensors, other than radar sensors, in combination with a dynamic model for the vehicle;
   calculating a second velocity value of the vehicle using the radar data, based on the tracking of the one or more stationary objects; and
   comparing the first velocity value with the second velocity value, for use in implementing one or more active safety features of the vehicle.

7. The system of claim 6, wherein the processor is further configured to at least facilitate:
   tracking the one or more objects in proximity to the vehicle over time using the radar data while the vehicle is in a steady state; and
   verifying that the one or more objects are stationary objects based on the tracking.

8. The system of claim 6, wherein:
   the one or more radar sensors are configured to at least facilitate obtaining a range and range rate for the one or more stationary objects with respect to the vehicle; and
   the processor is configured to at least facilitate calculating the second velocity value using the range and the range rate.

9. The system of claim 8, further comprising:
   a yaw sensor configured to at least facilitate measuring a yaw rate of the vehicle;

wherein the processor is configured to at least facilitate:
obtaining a location and azimuth angle rate of the one or more radar sensors of the vehicle with respect to a center of gravity of the vehicle via the radar data;
calculating the second velocity value using the range, the range rate, the location, the azimuth angle rate, and the yaw rate.

10. The system of claim 6,
providing a notification if a difference between the first velocity value and the second velocity value exceeds a predetermined threshold value.

11. A vehicle comprising:
a body;
one or more radar sensors configured to at least facilitate obtaining radar data pertaining to one or more stationary objects in proximity to the vehicle;
one or more additional vehicle sensors, other than radar sensors, that are configured to obtain sensor data pertaining to vehicle movement; and
a processor disposed within the body and coupled to the one or more radar sensors, the processor configured to at least facilitate:
tracking the one or more stationary objects, via a processor onboard the vehicle;
calculating a first velocity value of the vehicle using sensor data from one or more additional vehicle sensors, other than radar sensors, in combination with a dynamic model for the vehicle;
calculating a second velocity value of the vehicle using the radar data, based on the tracking of the one or more stationary objects; and
comparing the first velocity value with the second velocity value, for use in implementing one or more active safety features of the vehicle.

12. The vehicle of claim 11, wherein the processor is further configured to at least facilitate:
tracking the one or more objects in proximity to the vehicle over time using the radar data while the vehicle is in a steady state; and
verifying that the one or more objects are stationary objects based on the tracking.

13. The method of claim 1, further comprising:
implementing one or more of the active safety features of the vehicle, via the processor, using the comparison of the first velocity value with the second velocity value.

14. The method of claim 13, wherein the step of implementing the one or more of the active safety features comprises:
controlling braking for the vehicle by implementing one or more braking active safety features of the vehicle, via the processor, using the comparison of the first velocity value with the second velocity value.

15. The method of claim 13, wherein the step of implementing the one or more of the active safety features comprises:
controlling braking for the vehicle by implementing one or more braking active safety features of the vehicle, via the processor, using the comparison of the first velocity value with the second velocity value.

16. The method of claim 13, wherein the active safety feature is selected from the group consisting of automatic braking, braking assist, steering assist, traction control, electronic stability control, lane departure warning, and lane change awareness.

17. The method of claim 13, wherein the step of implementing the one or more of the active safety features comprises:
implementing one or more of the active safety features of the vehicle, via the processor, using the first velocity value, when the vehicle is not in a steady state and a difference between the second velocity value and the first velocity value is less than a predetermined threshold; and
implementing the one or more of the active safety features of the vehicle, via the processor, using the second velocity value, instead of the first velocity value, when the vehicle is not in a steady state and the difference between the second velocity value and the first velocity value is greater than a predetermined threshold.

18. The method of claim 17, further comprising:
providing a fault notification when the vehicle is in a steady state.

19. The method of claim 1, wherein the step of implementing the one or more of the active safety features comprises:
implementing one or more of the active safety features of the vehicle, via the processor, using the first velocity value, when the vehicle is not in a steady state and a difference between the second velocity value and the first velocity value is less than a predetermined threshold; and
implementing the one or more of the active safety features of the vehicle, via the processor, using the second velocity value, in addition, to the first velocity value, when the vehicle is not in a steady state and the difference between the second velocity value and the first velocity value is greater than a predetermined threshold.

20. The method of claim 19, further comprising:
providing a fault notification when the vehicle is in a steady state.

* * * * *